United States Patent [19]
Niimi et al.

[11] 3,892,907
[45] July 1, 1975

[54] REINFORCED REFRACTORY HEAT-INSULATOR

[75] Inventors: Itaru Niimi, Nagoya; Yasuhisa Kaneko; Fumiyoshi Noda, both of Toyota, all of Japan

[73] Assignee: Toyota Jidosha Kogyo Kabushiki Kaisha, Toyota, Japan

[22] Filed: Nov. 13, 1972

[21] Appl. No.: 305,894

[30] Foreign Application Priority Data
Nov. 13, 1971 Japan .......................... 46-90892

[52] U.S. Cl. .................. 428/303; 264/60; 29/191; 29/194; 428/472
[51] Int. Cl. .......................................... B32b 15/18
[58] Field of Search .......... 161/151, 160, 170, 207, 161/213; 117/129, 40, 53, 70; 29/191.2, 194, 191

[56] References Cited
UNITED STATES PATENTS

| | | | |
|---|---|---|---|
| 3,025,188 | 3/1962 | Larsh et al. | 117/129 X |
| 3,118,807 | 1/1964 | Holcomb | 161/196 |
| 3,583,919 | 6/1971 | Balint et al. | 117/129 X |
| 3,632,792 | 1/1972 | Nielsen et al. | 161/170 X |
| 3,676,293 | 7/1972 | Gruber | 29/191 X |
| 3,709,772 | 1/1973 | Rice | 161/151 X |

Primary Examiner—George F. Lesmes
Assistant Examiner—Patricia C. Ives
Attorney, Agent, or Firm—Stevens, Davis, Miller & Mosher

[57] ABSTRACT

A reinforced refractory heat-insulator having a refractory lining which contains dispersed metallic fibers and an exterior casting enveloping the refractory lining, and methods for fabricating such heat-insulators.

6 Claims, 5 Drawing Figures

REINFORCED REFRACTORY HEAT-INSULATOR

BACKGROUND OF THE INVENTION

The present invention relates to a heat-insulator, and more particularly to a refractory heat-insulator which is used as a conduit for passing corrosive hot gases.

In recent times the techniques of casting a premolded refractory with a low thermal conductivity in an envelope of metal has been made available for improving the heat insulation of pipes for passing gases which are corrosive at high temperatures. The refractories used in this technique, however, are non-metals which have much lower coefficients of thermal expansion than metals. Furthermore the bonding strength between metal and refractory, in general, is very small. Because of differences in the coefficients of thermal expansion between refractory and metal and the low bonding strength, refractories are likely to separate from the casting under repeated heating and cooling thereby causing a gap between the refractory and metal. This leads to failures of the fragile refractory when used under circumstances which subject the refractory to impacts and vibrations.

SUMMARY OF THE INVENTION

This invention obviates the aforementioned disadvantages of prior art devices.

An object of this invention is to provide a reinforced refractory heat-insulator which improves the impact strength of the refractory and the bonding power between a metal envelope and a refractory liner.

DETAILED DESCRIPTION OF THE INVENTION

Refractorys according to the present invention are obtained by dispersing metallic fibers in the refractory compositions. The reinforced refractorys to be enveloped in metallic castings are obtained by selecting the material quality, thickness and length of metallic fibers to be dispersed in the refractory, depending upon the kind of refractorys, the amount of fiber to be dispersed, and method to be used to disperse the fibers. The reinforced refractorys thus obtained are not only resistant to damage by vibration and impact, but they also can easily be used for liners in castings because the metallic fibers scattered therein substantially improve the bonding strength between castings and refractories.

Therefore the bonding strength prevents separation of the refractory from the casting envelope.

The materials available for the refractories of the present invention include refractory substances, such as castable alumina cement and castable silica cement, as well as other known refractory materials. Metallic fiber materials include stainless steels like JIS (Japanese Industrial Standard), SUS 27 (which corresponds to AISI 304 austenitic steel), JIS SUS 42 (which corresponds to AISI 310S austenitic steel) and Fe-Cr-Al alloys, and other metallic materials. Fiber of diameters of about 0.08–1.0 mm may be used, and fiber lengths may generally be selected in the range of about 5–30 mm.

Castings enveloping the reinforced refractories according to the present invention may be used as conduits for passing hot corrosive gases. In a more specific application such lined castings are used as exhaust ports of an internal combustion engine.

Figure 1:
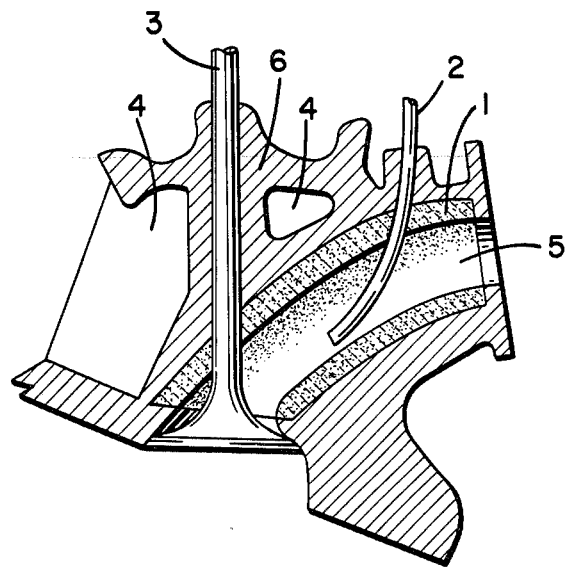
FIG. 1 is a partially schematic, sectional view of an exhaust port comprising one embodiment of the invention.

Referring to FIG. 1 illustrating an exhaust port of an internal combustion engine, 1 is a refractory which contains metallic fibers, 2 is an air injection port, 3 is an exhaust valve, 4 is a cooling jacket, 5 is the interior of the exhaust port, and 6 is a cylinder head which is cast to envelope refractory 1.

Exhaust gases generated in a combustion chamber of the engine exit through exhaust port 5 to the exhaust manifold or the manifold reactor, when the exhaust valve 3 opens. To improve the emission gas purifying ability of a converter or a manifold reactor attached close to exhaust port 5, the exhaust gas to be introduced into such apparatus has to keep as hot as possible. As one method of keeping the exhaust gas hot without overheating cylinder head 6, a refractory of low heat conductivity enveloped in a casting within an aluminum cylinder head 6 forming the exhaust port may be provided. Castings enveloping fragile conventional refractories are not particularly useful in such applications because of the aforementioned drawbacks. By contrast, the reinforced refractory 1 of the present invention contains metallic fibers, and it is enveloped in a casting (cylinder head 6), serves without breakage or fall-off. Accordingly the exhaust gas can be kept hot, and as a result, purifying action of attached converters or reactors is facilitated and a public nuisance averted.

EXAMPLE 1

Referring to FIG. 1, a cylinder head provided with this invention was prepared in the following manner.

Alumina castable cement with about 95.9% $Al_2O_3$ was used as the basic material. A slurry was obtained by adding about 17 parts of water to about 100 parts of this cement. About 2% (by volume) of JIS SUS 27 wires about 0.3 mm in diameter and about 20 mm in length, was added to the slurry, followed by about 10 minutes of mixing in a mixer. The resultant slurry mix was poured into a wooden mold with a polystyrene foam core. After being allowed to harden for about 24 hours, the casting was released from the mold and dried at about 100°C for about 24 hours, and then fired for about 3 hours at about 1,000°C, thereby yielding a fiber-reinforced ceramic refractory. This refractory was used as the core in a mold prepared for casting the cylinder head, and molten aluminum was poured into the mold, to produce a cylinder head 6 with refractory exhaust port 5.

The cylinder head was assembled onto an auto engine, the vehicle was submitted to an endurance test of 1,450 km run on a bad or rough road. The refractory did not break or fall-off. By contrast, a product made of the same material but without metallic fibers dispersed therein, when submitted to an endurance test of only 120 km, was broken with fragments of the refractory dropping from the exhaust port.

EXAMPLE 2

A manifold reactor is described with reference to FIG. 2 and FIG. 3. The same alumina castable cement as used in Example 1, with about 95.5% $Al_2O_3$ was used as the basic material. By adding about 17 parts of water to about 100 parts of this cement, a slurry was made and to this slurry was added about 2% (by volume) of JIS SUS-27 wires about 0.3 mm in diameter and about 5 mm in length, followed by about 10 minutes of mixing in a mixer. The slurry mix thus obtained was poured into a wooden mold having a polystyrene foam core. After about 24 hours of hardening, the casting was released from the mold, dried at about 100°C for about 24 hours, and finally fired at about 1,000°C for about 3 hours, thereby yielding a fiber-reinforced ceramic refractory. The refractory as a core, is set in a mold prepared for casting a manifold reactor, and molten iron like DCI 40 (ductile cast iron having strength of about 40 kg/mm²) is poured into the mold to produce a manifold reactor with a reinforced refractory lining.

A vehicle equipped with this manifold reactor was run about 30,000 kg on bad or rough roads, but no breaking or falling-off of the refractory occurred.

It is noted that this manifold reactor is devoid of an additional inner core. This system may be used because the heat insulation of the reinforced refractory of the present invention is so good that the reactor can satisfactorily purify emission gases without any additional inner core.

Figure 2:
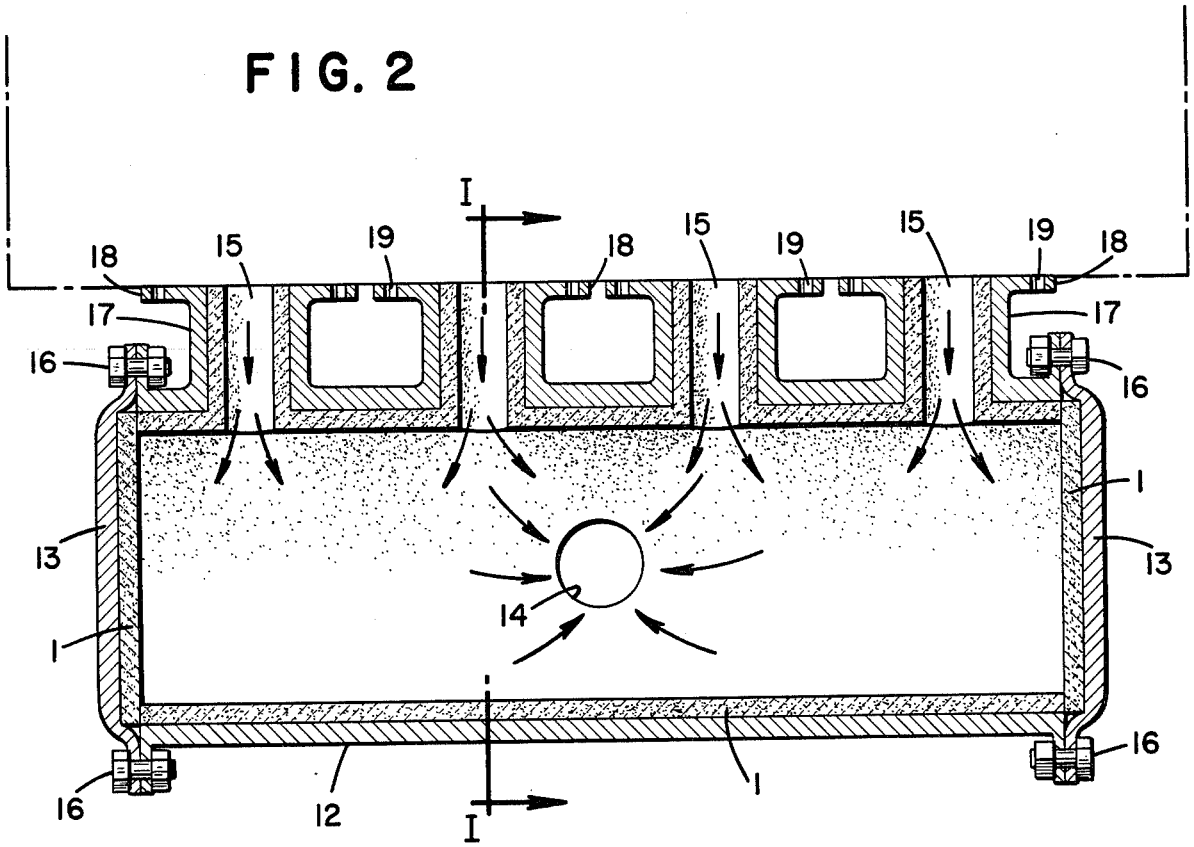
FIG. 2 is a partially schematic, sectional view of a manifold reactor which comprises another embodiment of the present invention.
Figure 3:
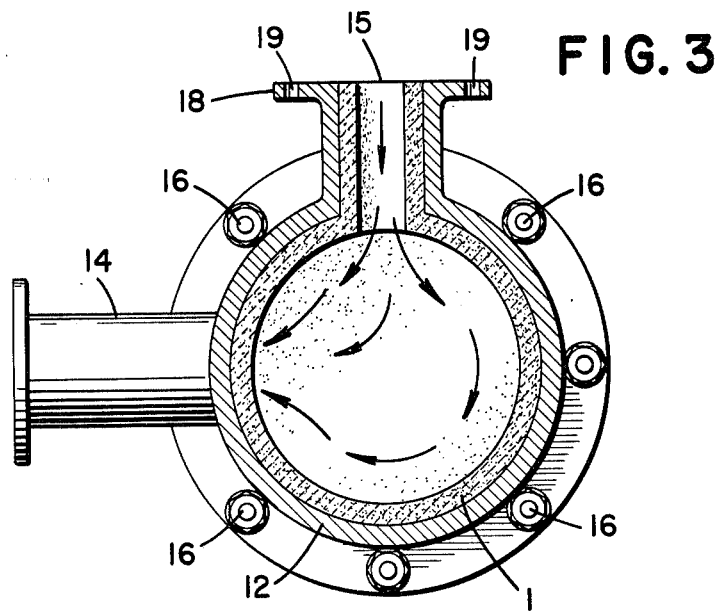
FIG. 3 is a sectional view taken along line I—I in FIG. 2.

As indicated in FIGS. 2 and 3, this manifold reactor comprises a refractory liner, reinforced by wires dispersed therein, integrally embracing a metallic outer casing 12 which is a cast envelope, thereby forming a manifold reactor assembly which may be of any desired shape; for example, it may be cylindrical. At both ends of the reactor assembly end plates 13, which envelope refractory 1 seals the outer casing of the manifold reactor assembly with bolts 16. Further, the manifold reactor assembly is attached to the exhaust manifold 17 to introduce the exhaust gas from the exhaust port 15, and connected to exhaust pipe 14 through which the exhaust gas exits. This exhaust manifold reactor is bolted to an engine (not shown) through holes 19 provided in the flanged part 18 of the exhaust manifold 17.

EXAMPLE 3

In order to determine the bonding strength between castings and refractorys, the following experiment was conducted.

Figure 4:
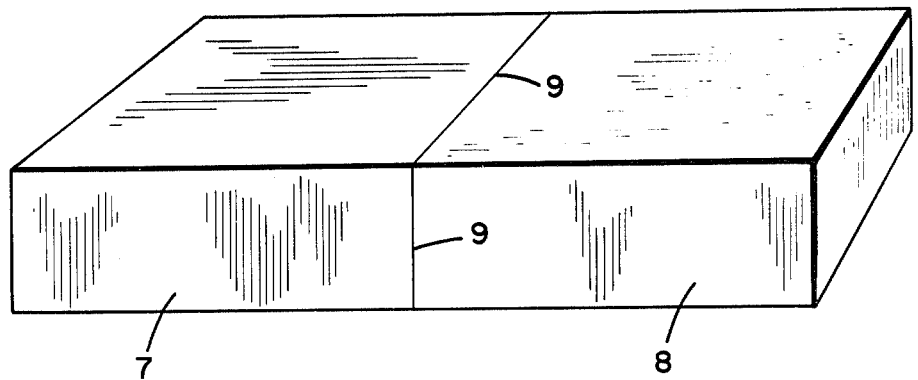
FIG. 4 and FIG. 5 illustrate techniques of measuring bonding strength.
Figure 5:
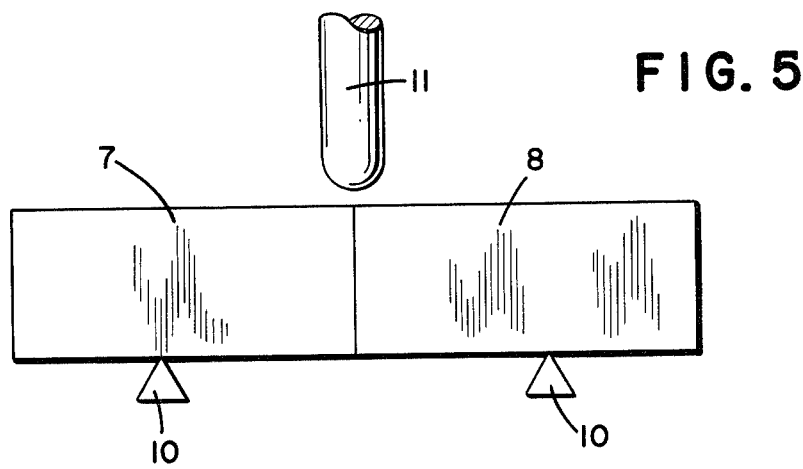

A prepared specimen comprising a refractory 7 containing metallic fibers and a casting 8 as illustrated in FIG. 4, where refractory 7 and casting 8 are adhered at a flat surface 9 in a casting process. The specimen measured about 10 mm thick, about 20 mm wide and about 80 mm long with the joint 9 at about the midpoint of the specimen. In the experiment, the specimen was placed on two supports 10,10 separated by about 40 mm as indicated in FIG. 5 so that the joint 9 is halfway between the supports. Then using a rupture strength tester which presses rod 11 downward, the specimen was tested for its rupture strength which is representive of the bonding strength between the refractory and cast metal portions of the test specimen. The results are summarized in Table 1, below:

TABLE I

| Speci-mens | Refractory | | | Casting metal | Rupture strength * (kg/cm²) | |
|---|---|---|---|---|---|---|
| | Material | Description dimensions | Volume Percentage | | Room temperature | 800 °C |
| No. 1 | $Al_2O_3$ castable | SUS27 0.3 mmφ x 20 mm | 2 | Al(AC8A) | 280 | 208 |
| No. 2 | do. | Fe-Cr-Al alloy 0.5φ×20 | do. | do. | 245 | 190 |
| No. 3 | do. | — | 0 | do. | 187 | 50 |
| No. 4 | $SiO_2$ castable | do. | 2 | Cast iron DCI 40 | 276 | 225 |
| No. 5 | do. | SUS27 0.3φ×20 | do. | do. | 265 | 230 |
| No. 6 | do. | — | 0 | do. | 95 | 70 |

* Rupture always occurred at bonded joint.

From the aforementioned description, the construction and the methods of making the heat-insulator will be readily understood. However, since numerous modification and changes will readily occur to those skilled in the art, the foregoing description is not intended to limit the invention to the exact construction and the method described. Accordingly, applicants claim all suitable modifications and equivalents falling within the scope of the appended claims.

What is claimed is:

1. A reinforced refractory heat-insulator comprising a cast ceramic inner refractory lining containing dispersed metallic fibers, and an exterior iron or aluminum casting which envelops said refractory lining.

2. The reinforced refractory heat-insulator of claim 1, wherein said refractory material comprises a cast material selected from the group consisting of castable alumina and castable fused silica.

3. The reinforced refractory heat-insulator of claim 1, wherein said metallic fiber material comprises a metal selected from the group consisting of: stainless steels and ferrite-chromium-aluminum alloys.

4. The reinforced refractory heat-insulator of claim 1, wherein the diameter of said metallic fibers is in the range of about 0.08 to about 1.0 mm.

5. The reinforced refractory heat-insulator of claim 1, wherein the length of said fibers is in the range of about 5 to 30 mm.

6. The reinforced refractory heat-insulator of claim 1, wherein said inner refractory lining is bonded to said exterior metallic casting.

* * * * *